UNITED STATES PATENT OFFICE.

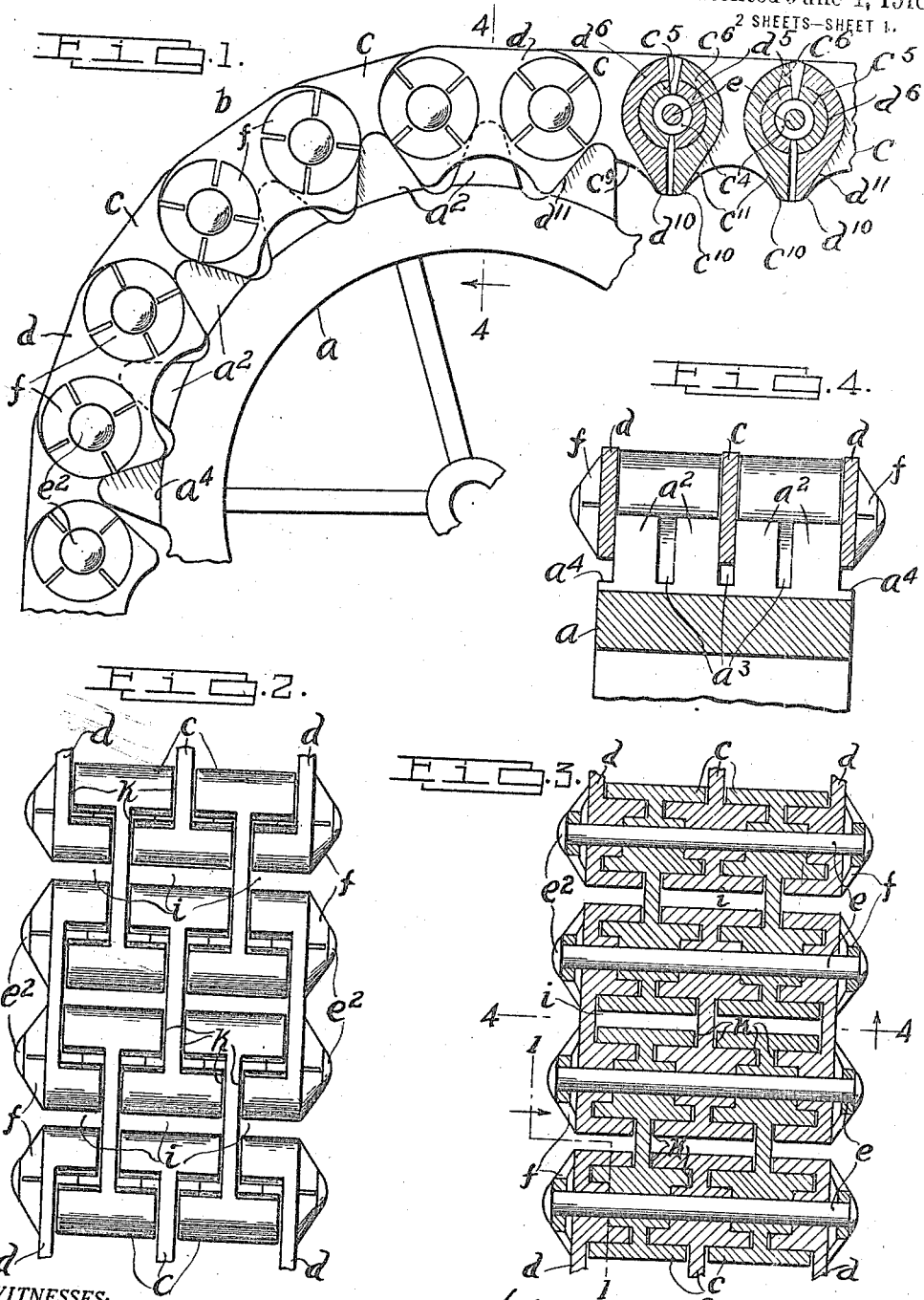

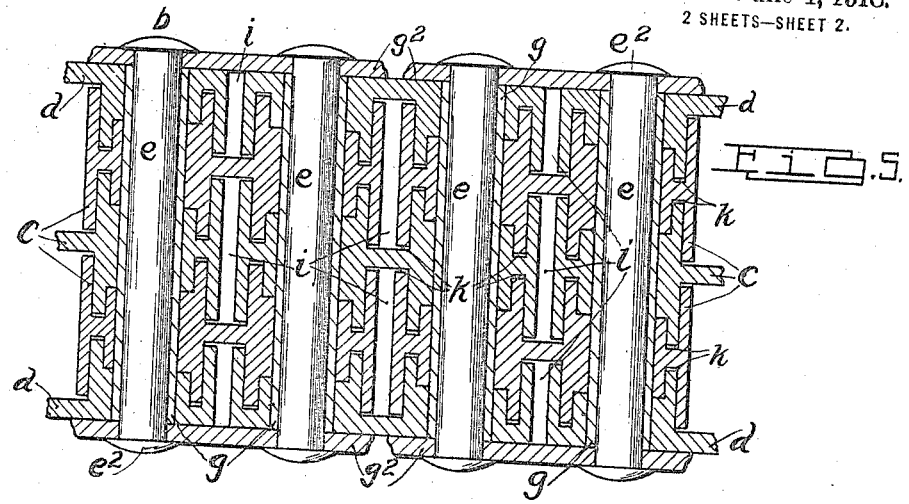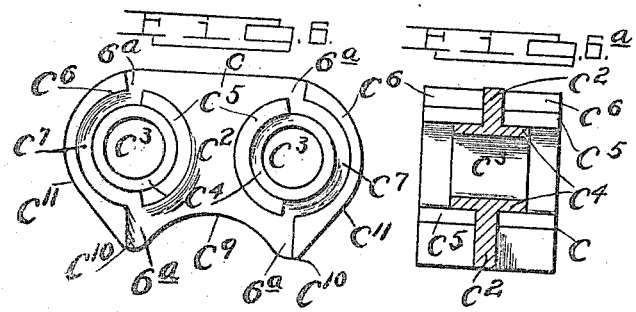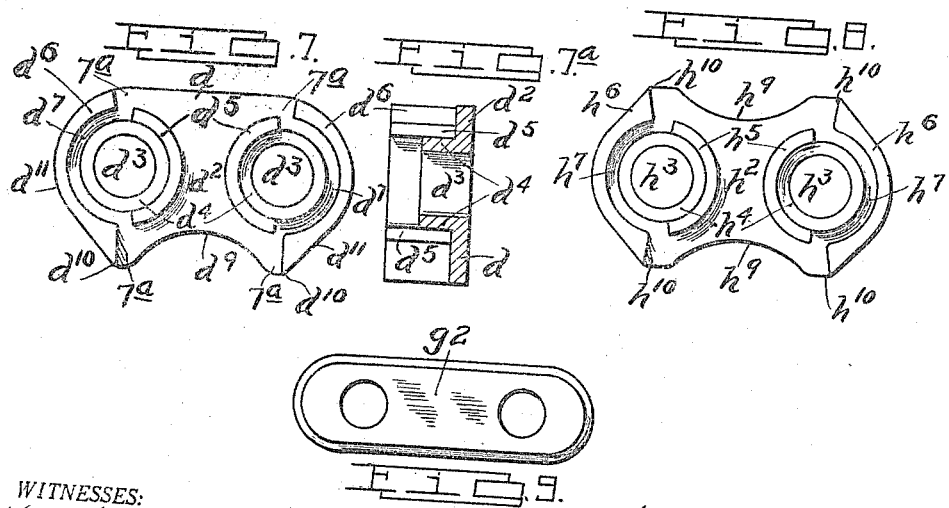

HEBRON BERNARD LAYMAN, OF NEW YORK, N. Y., ASSIGNOR OF ONE-FOURTH TO F. E. LONAS, OF NEW YORK, N. Y.

CHAIN.

1,268,254.     Specification of Letters Patent.     Patented June 4, 1918.

Application filed May 26, 1916, Serial No. 99,931. Renewed December 15, 1917. Serial No. 207,359.

*To all whom it may concern:*

Be it known that I, HEBRON BERNARD LAYMAN, a citizen of the United States, and residing at New York, in the county of New York and State of New York, have invented certain new and useful Improvements in Chains, of which the following is a specification, such as will enable those skilled in the art to which it appertains to make and use the same.

This invention relates to chains, especially multiple strand chains, and particularly driving chains and more particularly, but not solely, to silent or angular-toothed chains.

An object of this invention is to increase the effective bearing area of the links comprising the chain; another object is to increase the contact of the links with the gear; another, is to provide a drive chain in which the greatest possible strength is secured in proportion to its width and weight. Other objects will appear hereafter in the specification and in the claims, discernible to those skilled in the art.

In the drawings, by way of example only:—

Figure 1 is a side view of a part of a gear or sprocket wheel having a piece of my improved drive chain mounted thereon and part of which is in section, the section being on the line 1—1 of Fig. 3;

Fig. 2 a plan view of a part of the chain extended;

Fig. 3 a horizontal sectional view of a part of the chain extended;

Fig. 4 a transverse section on the line 4—4 of Figs. 1 and 3;

Fig. 5 a view similar to Fig. 3 but showing a modification;

Fig. 6 a side view of one of the central or intermediate links of which the chain is composed;

Fig. 6$^a$ a section on either of the lines 6$^a$—6$^a$ of Fig. 6;

Fig. 7 a view similar to Fig. 6 but showing one of the side links employed in the construction of the chain;

Fig. 7$^a$ a section on either of the lines 7$^a$—7$^a$ of Fig. 7;

Fig. 8 a view similar to Fig. 6 but showing a modified form of link used in a chain designed to gear on both sides of the pitch line.

Fig. 9 a side view of a washer plate which I may employ.

In the accompanying drawings, $a$ is a part of the rim of the gear or sprocket wheel that may be used with my new chain. Its sprockets or teeth $a^2$ are cut circumferentially to form deep recesses, $a^3$ to receive the central web portions of the intermediate links of the chain. The ends of the gear teeth are also provided with recesses $a^4$ to receive the central web of the side links.

The chain $b$ is composed of central links $c$ and side links $d$ and one of each is shown detached in Figs. 6 and 7 respectively. The links $c$ consist of a body or web portion $c^2$ the ends of which are approximately arc-shaped, and said body or web portion is provided in the opposite ends with pin holes $c^3$ around which are bushing bearings $c^4$ which as shown project at each side of the body or web portion. On the inner side of the bushing bearings $c^4$ are arc-shaped bearings $c^5$ which as shown are of greater transverse dimensions than the bushing bearings $c^4$, and at the ends of the body or web portion are other arc-shaped bearings $c^6$ separated from the bushing bearings $c^4$ by arc-shaped grooves or spaces $c^7$. The bottom edge of the web or body portion is cut out arc-shaped, as shown at $c^9$, and the end portions form angular teeth $c^{10}$ having outer side surfaces $c^{11}$ which mesh with the teeth of the gear. These bearing surfaces $c^{11}$ are made much wider than the thickness of the body or web portions, by the downward extension of the arc-shaped bearings $c^6$.

The side links $d$ of the chain are similar to the central links $c$ except that the bushing bearings $d^4$ around the pin holes $d^3$ are on one side only of the web or body portion $d^2$ as are also the arc-shaped bearings $d^5$ and $d^6$ and the corresponding grooves $d^7$. The body or web portion is cut out to form an arc-shaped recess $d^9$ and the end portions form the sprockets or teeth $d^{10}$ having bearing surfaces $d^{11}$ which mesh with the teeth of the gear.

The links are connected by tie pins $e$ passed through the pin holes of the central and side links and said pins are provided at their ends with spring washers $f$, in the form of construction shown, which bear on the side links and the ends of said pins are riveted, as shown at $e^2$.

When the links are connected as shown in Figs. 2 and 3, the side and central links together have a bearing on the entire surface of the pins $e$, and the bushing $d^4$ of the side link is inclosed by the arc-shaped bearing $c^5$ of the central link, which in turn is encompassed and borne upon by the supplementary arc-shaped bearing $d^6$ of the side link. Also the central link supplementary bearing $c^6$ incloses and contacts with the arc-shaped bearing $d^5$ of the side link, which in turn surrounds the bearing $c^4$ of the central link. Similarly, the bearings of the adjacent central links interlock, as shown in Fig. 3, and strain upon one transverse set of links is distributed over the adjacent links. Thus the danger of shearing or breaking the tie pins is reduced to a minimum, if not rendered impossible.

In the operation of the chain and gear shown, the central body portions $c^2$ of the central links pass through the circumferential recesses $a^3$ in the teeth $a^2$ of the gear, and the corresponding central web or body portions of the side links $d$ pass through or operate in the recesses $a^4$ at the ends of said teeth, as clearly shown in Fig. 4.

Obviously I may apply my invention to the common form of "silent" chain link, in which the body or the webbed portion of the link is cut out to straddle the teeth of the gear, but one of the features of the form of link which I have shown in the drawings by way of example, is that as a line drawn between the centers of the pin holes $c^3$ and $d^3$ would divide the body or web portion of the link approximately centrally thereof, "springing" of the links and the consequent alteration of the included angle of the link faces is entirely obviated.

The construction shown in Fig. 5 is the same as that shown in Figs. 1 to 4 inclusive, except that pin bushings $g$ are employed which are in length equal to the width over the links and side plates $g^2$ are mounted on the sides of the chain and the pins $e$ pass therethrough, and the arrangement of the side plates $g^2$ corresponds with the arrangement of the link members, as clearly shown in Fig. 5 so that the open spaces $i$ formed in the opposite sides of the chain at the ends of each pair of said links are closed by said side plates $g^2$ and this increases the strength of the said chain.

In Fig. 8 I have shown a link $h$ in all respects similar to the links $c$, and designated by corresponding reference characters, but toothed both sides of the pitch line.

I may also provide clearance spaces $k$ between the side faces of the arc-shaped bearing members and the body portions of the links, the object of which is to prevent unnecessary friction, binding or gripping occasioned by abraded material, produced in the operation of the chain, collecting between the links.

In the construction shown, the bushing bearings $c^4$, $d^4$ and $h^4$ are annular in form, or form complete circles, but this is not absolutely necessary and other forms may be employed, and other changes in and modifications of the construction herein described may be made, within the scope of the appended claims, without departing from the spirit of my invention or sacrificing its advantages.

In the accompanying drawings the intermediate links $c$ are of I-shape in cross section, while the side links $d$ are half I-shape in cross section. Obviously I may form the chain entirely of links such as $d$ in the accompanying drawings.

I do not bind myself to any particular manner of making the links; I may form them by die-casting, or by coining, or from sheet metal stampings, or in any other desired manner, and while I have shown the bearings $c^4$, $c^5$ and $c^6$ of the intermediate links and the bearings $d^4$, $d^5$ and $d^6$ of the side links as made intergral with the web or body portion $c^2$ and $d^2$ respectively, I do not limit myself to this construction, and I may apply one or all of these bearings to the body portion.

I have shown the rivets as cylindrical, but I may employ tubular rivets, or substitute any commonly known form of rivet or tie pin or pivot pin, whether circular in cross section or not. Furthermore, I do not limit myself to "silent" or angular tooth chains, but may apply my invention to any and all of the commonly known forms of chains.

Having fully described my invention what I claim as new and desire to secure by Letters Patent, is:—

1. A drive chain composed of central or intermediate links and side links comprising flat body or web portions having pin holes in their opposite ends, the central or intermediate links being provided with bushing bearings which project on the opposite sides thereof, and inwardly of said bushing bearings with supplemental arc-shaped bearings, and outwardly of said bushing bearings with supplemental arc-shaped bearings between which and the bushing bearings are arc-shaped grooves, both the inward and outward arc-shaped bearings being wider in transverse section than the bushing bearings, and the side links being provided on one side thereof with similar bushing bearings and arc-shaped bearings.

2. A drive chain composed of central or intermediate links and side links comprising flat body or web portions having pin holes in their opposite ends, the central or intermediate links being provided with bushing bearings which project on the opposite sides thereof, and inwardly of said bushing bearings with supplemental arc-shaped bearings, and outwardly of said bushing bearings with supplemental arc-shaped bearings between which and the bushing bearings are arc-shaped grooves, both the inward and outward arc-shaped bearings being wider in transverse section than the bushing bearings, and the side links being provided on one side thereof with similar bushing bearings and arc-shaped bearings, both sets of said links being provided at a side edge thereof with projecting sprockets or teeth formed partly by a continuation or extension of the outward arc-shaped bearings.

3. A power device of the class described comprising a gear, the rim of which is provided with transverse teeth having circumferential recesses and a drive chain composed of links having flat body or web portions movable in or through said recesses, said links being provided in their opposite end portions with pin holes and tie pins passing through said holes, said links being also divided into central or intermediate links and side links, the central or intermediate links being provided around the pin holes with bushing bearings which project at the opposite sides thereof, and inwardly of which are supplemental arc-shaped bearings and outwardly of which are supplemental arc-shaped bearings separated from the bushing bearings by arc-shaped grooves or recesses, and the side links being provided on the inner sides thereof only, with similar bearings and both sets of links being provided on one side of said chain with projecting sprocket teeth formed partly by the body or web portions thereof and partly by the outward arc-shaped bearings.

4. A power device of the class described, comprising a gear the rim of which is provided with transverse teeth having circumferential recesses, and a drive chain composed of links having flat body or web portions movable in or through said recesses, said links being provided in their opposite end portions with pin holes and tie pins passing through said holes, said links being also divided into central and intermediate links and side links, the central or intermediate links being provided with bushing bearings around the pin holes which project on both sides thereof, and inwardly of which are supplemental arc-shaped bearings, and outwardly of which are supplemental arc-shaped bearings, separated from the bushing bearings by arc-shaped grooves or recesses, and the side links being also provided on the inner sides thereof only with similar bearings, the links of said chain being also provided with sprocket teeth which operate in connection with the teeth of the gear, or on which the teeth of the gear operate.

5. In a driving chain, a link having a laterally projecting end constituting a gear face, a bearing in one end portion of said link, a supplementary arc-shaped bearing concentric therewith, and an arc-shaped groove between said laterally projecting end and first said bearing.

6. In a driving chain, a link having a laterally projecting end constituting a gear face and an arc-shaped bearing, a second bearing in one end portion of said link, a supplementary arc-shaped bearing concentric therewith, and an arc-shaped groove between said laterally projecting end and said second bearing.

7. In a driving chain, a link having a laterally projecting end constituting a gear face and an arc-shaped bearing, a second bearing in one end portion of said link, a supplementary arc-shaped bearing concentric therewith, and an arc-shaped groove between said laterally projecting end and said second bearing, both said bearings projecting outwardly beyond the link web.

8. In a driving chain, a link having a projecting bearing in one end portion, an arc-shaped bearing concentric therewith and spaced therefrom, and a supplementary arc-shaped bearing on the same side of the link but opposite to first said arc-shaped bearing.

9. In a driving chain, a link having a pin hole, a laterally projecting end constituting a gear face, a bearing in one end portion of said link, a supplementary arc-shaped bearing concentric therewith, and an arc-shaped groove between said laterally projecting end and first said bearing.

10. In a driving chain, a link having a pin hole, a laterally projecting end constituting an arc-shaped bearing and a gear face, a second bearing in one end portion of said link, a supplementary arc-shaped bearing, and an arc-shaped groove between said laterally projecting end and said second bearing.

11. In a driving chain, a link having in one end portion thereof a pin hole, a lateral projection constituting a gear face, a bearing, and a supplementary arc-shaped bearing on the same side of the link, but opposite to said lateral projection, both of said bearings projecting outwardly beyond the link web.

12. In a driving chain, a link having a pin hole, a laterally projecting end constituting a gear face and an arc-shaped bearing, a second bearing in one end portion of said link, a supplementary arc-shaped bearing concentric therewith, and an arc-shaped groove between said laterally projecting end and said second bearing, both said bearings projecting outwardly beyond the link web.

13. In a driving chain, a link having a pin hole, a projecting bearing in one end portion, an arc-shaped bearing concentric therewith and spaced therefrom by an arc-shaped groove, and a second arc-shaped bearing on the same side of the link but opposite to first said arc-shaped bearing.

14. In a driving chain, a link having in one end portion thereof a bearing, and two oppositely disposed concentric arc-shaped bearings.

15. In a driving chain, a link having in one end portion thereof a pin hole, and two oppositely disposed concentric arc-shaped bearings.

16. In a driving chain, a link having in one end portion thereof a pin hole and a projecting bearing, and two oppositely disposed concentric arc-shaped bearings.

17. In a driving chain, a link having oppositely disposed in one end portion of one side thereof a lateral projection constituting a gear face, and an arc-shaped bearing.

18. In a driving chain, a link having in one end portion thereof a lateral projection constituting an arc-shaped bearing and a gear face, and a second arc-shaped bearing concentric with the first named arc-shaped bearing.

19. In a driving chain, a link having in one end portion thereof, a lateral projection constituting an arc-shaped bearing and a gear face, a projecting bearing, and a supplementary arc-shaped bearing.

20. In a driving chain, a link having in one end portion of one side thereof, a pair of oppositely disposed concentric arc-shaped bearings.

21. In a driving chain, a link having an arc-shaped bearing, a second arc-shaped bearing opposite to the first said arc-shaped bearing, the first said arc-shaped bearing being adapted to bear upon the second said arc-shaped bearing of a substantially similar coöperating link.

22. In a driving chain, a link having an arc-shaped bearing, a second arc-shaped bearing opposite to the first named arc-shaped bearing, the first named arc-shaped bearing being adapted to bear upon the second named arc-shaped bearing of a substantially similar coöperating link, and the second named arc-shaped bearing being adapted to bear upon the first named arc-shaped bearing of the said substantially similar coöperating link.

23. In a driving chain, a link having a laterally projecting end constituting an arc-shaped bearing and a gear face, and a second arc-shaped bearing opposite to first said arc-shaped bearing, the first said arc-shaped bearing being adapted to bear upon the second arc-shaped bearing of a substantially similar coöperating link.

24. In a driving chain, a link having a laterally projecting end constituting an arc-shaped bearing and a gear face, and a second arc-shaped bearing opposite to said first-named arc-shaped bearing, said first named arc-shaped bearing being adapted to bear upon the second named arc-shaped bearing of a substantially similar coöperating link, and the second named arc-shaped bearing being adapted to bear upon the first named arc-shaped bearing of the said substantially similar coöperating link.

25. In a chain, a link having a laterally projecting end constituting a gear face and an arc-shaped bearing, a second bearing in one end portion of said link, and an arc-shaped groove between said laterally projecting end and said second bearing, both said bearings projecting outwardly beyond the link web.

26. In a chain, a link having a pin hole, a laterally projecting end constituting a gear face, a bearing on one end portion of said link, and an arc-shaped groove between said laterally projecting end and said bearing.

27. In a chain, a link having a laterally projecting end constituting a gear face and an arc-shaped bearing, a second bearing in one end portion of said link, and an arc-shaped groove between said laterally projecting end and said second bearing.

28. In a chain, a link having a projecting bearing in one end portion, and an arc-shaped bearing concentric therewith and spaced therefrom by an arc-shaped groove, the said arc-shaped bearing being of less than 180° arc length.

In testimony that I claim the foregoing as my invention, I have signed my name in presence of the subscribing witnesses this 15th day of May, 1916.

HEBRON BERNARD LAYMAN.

Witnesses:
M. C. MEYER,
H. A. SOULIS.

Copies of this patent may be obtained for five cents each, by addressing the "Commissioner of Patents, Washington, D. C."